Jan. 18, 1944.　　　L. A. HUSBAND　　　2,339,699
GAUGE FOR TAPERED PIPE THREAD
Filed Nov. 10, 1942

Inventor
Linton A. Husband
By Blackmore, Spencer & Flint
Attorneys

Patented Jan. 18, 1944

2,339,699

UNITED STATES PATENT OFFICE 2,339,699

GAUGE FOR TAPERED PIPE THREAD

Linton A. Husband, Elmhurst, Ill., assignor to General Motors Corporation, Detroit, Mich., a corporation of Delaware Application November 10, 1942, Serial No. 465,099

6 Claims. (Cl. 33—199)

An improved gauge for testing tapered pipe thread is the subject matter of this invention.

The object sought to be attained is the provision of a gauge by the use of which tapped pipe threads may be gauged, the truncation tested and the depth of the threaded opening measured.

Another object is to provide such a gauge which is simple, requires no adjustments and by the use of which even an inexperienced shopman may perform the required tests.

The accompanying drawing shows an embodiment of the gauge.

Figure 1:
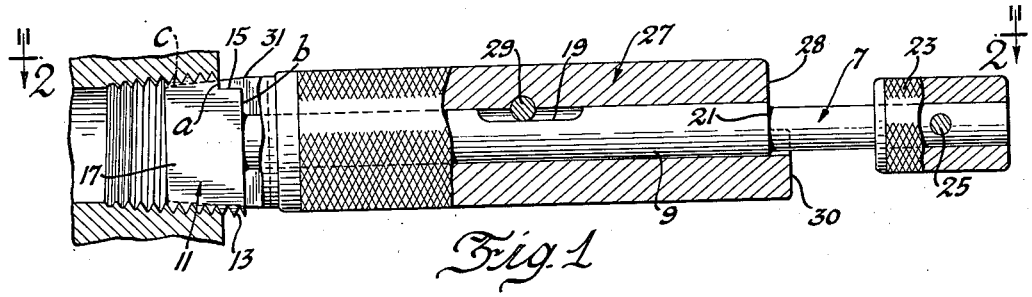
Figure 1 is a transverse section through the instrument.
Figure 2:
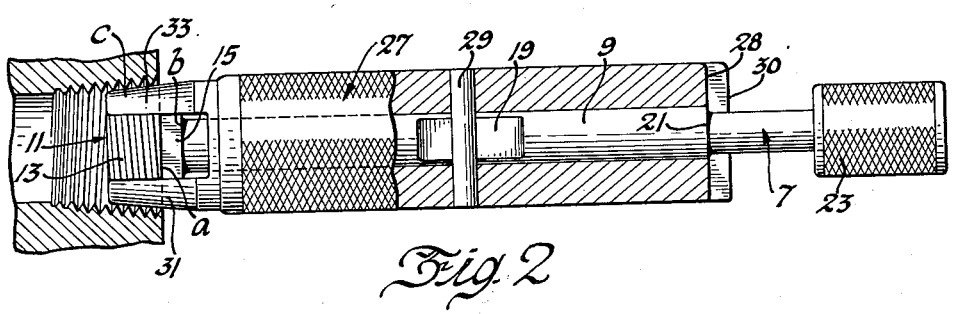
Figure 2 is a transverse section at right angles to the section of Figure 1.
Figure 3:
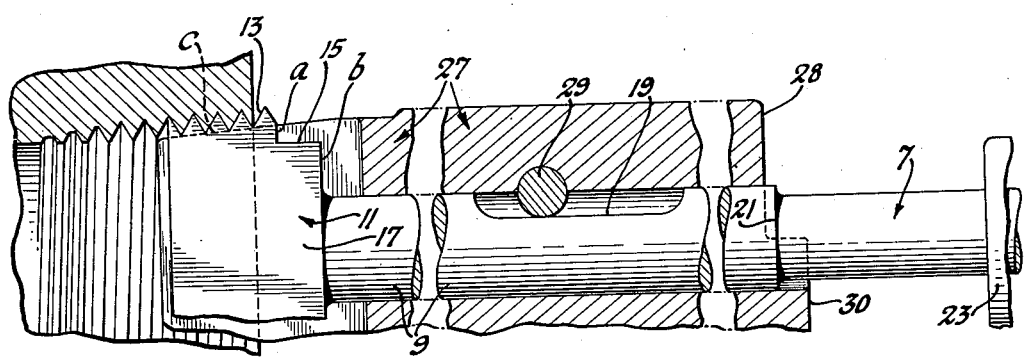
Figure 3 is a section like that of Figure 1, the larger scale showing how the instrument is used.
Figure 4:
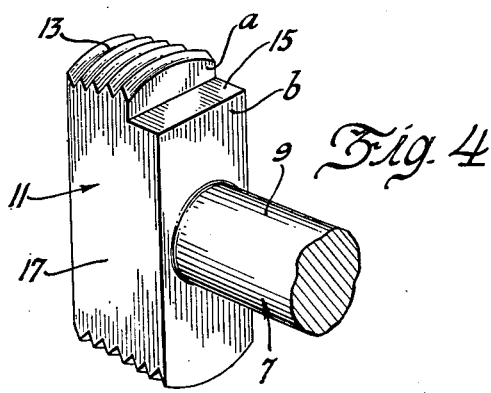
Figure 4 is a detail in perspective of one of the parts.

The gauge is made up of two parts. One part marked 7 may be called the thread gauge. It has a shank 9 terminating in an enlarged end 11. The end 11 is threaded as at 13. The threaded portion will be an exact duplicate of a standard National Tapered Plug gauge. It is formed with a gauging notch marked 15 and with milled flats 17. Intermediate its length the shank is formed with a slot 19. Toward the opposite end the shank is reduced forming a shoulder or mark 21. At the end of the shank is a handgrip 23 secured by a pin 25.

Surrounding the thread gauge is a truncation gauge designated as a whole by numeral 27. It is a tubular member with a pin 29 traversing the slot 19 of the thread gauge whereby there is a limited relative axial movement of the two parts 7 and 27. The work end of truncation gauge is tapered as at 31. This tapered end is slotted forming furcations 33 forming with the flatted head 11 of the thread gauge a provision for relative sliding but non-rotating movement between the two parts 7 and 27. The outer surface of part 27 is preferably knurled and the extreme end is notched to form a gauging portion having faces 28 and 30.

The alignment is substantially perfect owing to the sliding fit of part 7 and 27. No cocking of the truncation gauge can take place. Testing is made without resort to dials or vernier attachments making its use a very simple matter. All parts are readily constructed and if and when they become worn they can readily be chrome plated and reground to size.

The operation is very simple. The thread gauge is threaded into the opening having the tapered thread. The position of the notch 15 measures the depth of the threaded opening and its diameter. The notch 15 is so formed that the surface of the threaded opening should lie between points on the gauge marked a and b. Thereafter the truncation gauge is reciprocated so that its sloping face c lies on the crests of the teeth. The accuracy of truncation is determined by the position of 21 on the thread gauge relative to the faces 28 and 30 on the truncation gauge. These are so formed that if notch 21 lies between faces 28 and 30 the truncation is accurate within the limits provided.

I claim:

1. A gauge to measure a tapered pipe thread comprising a stem having at one end a standard thread to form a thread gauge, a sleeve slidable along and about but non-rotatable relative to said stem and having adjacent said standard thread a conical end forming a truncation gauge, a formation on the thread gauge adjacent its thread to determine by its relation to the surface of the threaded opening of the pipe when threaded therein the diameter of the surface of the opening and the depth of the opening and cooperating formations on the thread gauge and truncation gauge and spaced axially from said stem threads to test the truncation of the threaded opening.

2. The invention defined by claim 1, said first mentioned formation on the thread gauge comprising a notch on the threaded end thereof.

3. The invention defined by claim 1, said cooperating formations comprising a marker on the thread gauge and spaced limiting faces on the truncation gauge.

4. In a pipe thread gauge device, a thread gauge having threads at one end, a truncation gauge having a conical end adjacent said first mentioned gauge threads, means to provide said gauges with limited relative axial but non-rotative movement, a formation on said thread gauge adjacent its threaded end to measure the depth of the pipe thread opening by reference to surface of said opening and cooperating formations on said thread gauge and truncation gauge to determine the truncation of said threaded opening, said last mentioned formations being axially spaced from said first mentioned formation.

5. The invention defined by claim 4, said truncation gauge being a sleeve slidable on said thread gauge and having a tapered end to contact the crests of the pipe threads.

6. The invention defined by claim 4, said thread gauge comprising a stem terminating with an enlarged, flatted and threaded end and said tapered end of the truncation gauge formed with furcations whereby said truncation gauge is slidably related to the flatted end of said thread gauge.

LINTON A. HUSBAND.